United States Patent [19]

Brady et al.

[11] 3,962,953
[45] June 15, 1976

[54] ROTARY TOOL HOLDERS

[75] Inventors: Philip James Brady, Harrow Weald; Allen John Alford, London, both of England

[73] Assignee: Babb Engineering Company Limited, Waltham Cross, England

[22] Filed: Dec. 23, 1974

[21] Appl. No.: 535,159

[30] Foreign Application Priority Data
Dec. 29, 1973 United Kingdom............. 60139/73

[52] U.S. Cl................................................. 90/11 A
[51] Int. Cl.[2]......................................... B23C 5/28
[58] Field of Search......................... 90/11 A, 11 B; 29/105 A; 279/83, 1 R

[56] References Cited
UNITED STATES PATENTS

| | | | |
|---|---|---|---|
| 1,699,837 | 1/1929 | Everett | 279/83 |
| 1,708,040 | 4/1929 | Zerk | 279/83 X |
| 2,667,687 | 2/1954 | Clarkson | 279/1 R |
| 3,139,800 | 7/1964 | Clarkson et al. | 90/11 A |
| 3,444,781 | 5/1969 | Sunderman et al. | 90/11 A |

*Primary Examiner*—J. M. Meister
*Assistant Examiner*—Fred A. Silverberg
*Attorney, Agent, or Firm*—Friedman & Goodman

[57] ABSTRACT

A rotary tool holder of the type in which the tool has threaded engagement with a member projecting from a rotary body and the latter affords a forwardly directed radially extending locating face which engages a complementary face of the tool to locate the latter axially in use. In order to relieve the frictional engagement at such locating surface after the tool has been used, the member which is threadedly engaged with the tool is slidably received in a recess in the body and held initially in an axially retracted position, in which the tool engages the locating face, by means of a pair of grub screws engaging inclined faces afforded by a head portion of the member within said recess. When the grub screws are slackened, the member is allowed to move outwardly of the recess by an extent sufficient to relieve the frictional contact between the tool and the locating face so as to enable the tool threadedly to be unscrewed from a threaded member.

8 Claims, 4 Drawing Figures

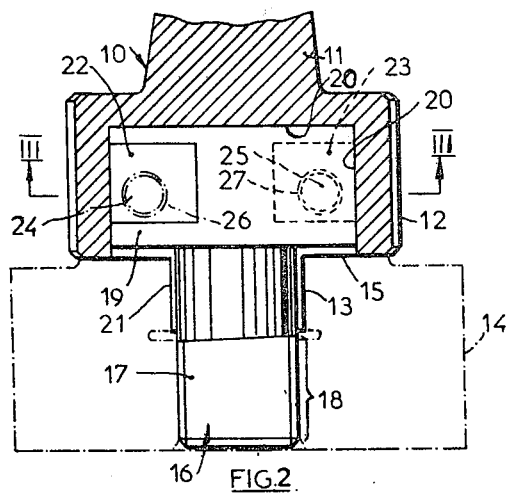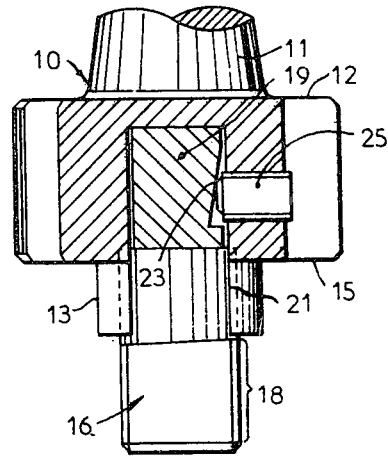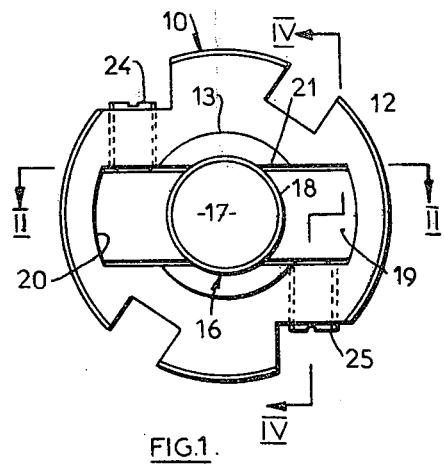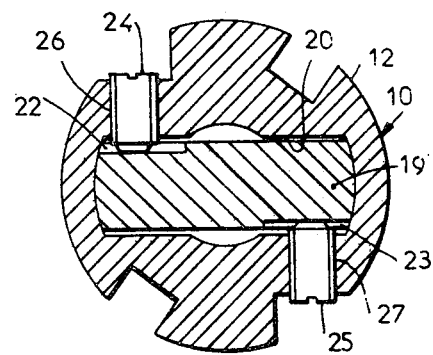

ROTARY TOOL HOLDERS

BACKGROUND OF THE INVENTION

1. Field of the Invention

This invention relates to tool holders of the kind comprising a rotary body carrying at the forward end thereof a screw threaded member for screw threaded engagement with a rotary tool, the forward end of the body including a radially extending locating face for engagement with a complementary face of such tool. Such tool holders are hereinafter referred to as being of the kind specified.

2. Description of the Prior Art

When rotary tool holders of the kind specified are in use, the rotaty tool mounted thereon becomes tightly wedged against the locating face at the forward end of the body and in order to provide for easy removal of the rotary tool, the screw threaded member in one such type of tool holder is itself threadedly engaged with the body by means of a screw thread of non-locking helix angle, the body also being provided with releasable locking means for securing the screw threaded member against undesired rotational and axial movement. However, the formation of the appropriate screw threads or helical splines within a bore in the body is a difficult and expensive step which the present invention seeks to avoid.

SUMMARY OF THE INVENTION

According to the present invention we provide a rotary tool holder of the kind specified wherein the screw threaded member is formed with a head which is slidably received within a recess extending axially from the forward end of the body, and the head is formed with at least one laterally presented face which is inclined outwardly in a direction away from the forward end of the body, the body being provided with a locking screw movable in a direction towards and away from said inclined face so as either to hold the screw threaded member in an axially retracted position by engagement with said inclined face at a position adjacent to the end thereof nearer the forward end of the body, or to allow the screw threaded member to move axially outwardly relative to the body.

Preferably, the head of the screw threaded member extends transversely relative to a shank portion on which is formed the screw thread for engagement by the rotary tool. The transverse head is preferably formed with two such inclined faces on respective opposed sides thereof. Such two inclined faces are preferably disposed in diametrically opposed relation relative to the axis of rotation of the body.

BRIEF DESCRIPTION OF THE DRAWINGS

The invention will now be described by way of example with reference to the accompanying drawings wherein:

FIG. 1 shows an underneath plan view of a rotary tool holder in accordance with the invention, FIG. 2 shows a section on the line II—II of FIG. 1, FIG. 3 shows a section on the line III—III of FIG. 2, and FIG. 4 shows a section on the line IV—IV of FIG. 1.

DESCRIPTION OF THE PREFERRED EMBODIMENT

Referring to the accompanying drawings, the rotary tool holder shown therein comprises a body 10 including a tapered portion 11, a cylindrical portion 12 and a spigot portion 13 at the forward end thereof. The spigot portion 13 affords a circumferential face to centre accurately a tool, such as a milling cutter 14, and the shoulder between the cylindrical portion 12 and spigot portion 13 of the body defines a radially extending forwardly presented locating face 15 which serves to locate the tool 14 in the axial direction.

To secure the tool 14 to the body 10, the latter is provided with a screw threaded member 16. The latter includes a shank 17 which is threaded over that part of its length which is indicated at 18, projects beyond the body for threaded engagement with the tool 14 in known manner. The threaded member 16 also includes a transversely extending head portion 19 which is slidably received within a correspondingly shaped recess 20 formed in the cylindrical portion 12 of the body 10, as best shown in FIG. 3, where relative rotational movement between the body 10 and the threaded member 16 is obviously prevented by the connection shown. The spigot portion 13 is bisected by a diametrally extending slot 21 to allow the head portion 19 of the threaded member 16 to enter the recess 20.

The head portion 19 of the threaded member 16 is formed with two inclined flat faces 22 and 23 on opposed parallel sides thereof in diametrically opposed relation to the axis of rotation of the body and in laterally offset relation to each other. The faces 22 and 23 are inclined outwardly in a direction away from the locating face 15. As can be seen most clearly from FIG. 4, the head portion 19 is thus effectively of undercut form.

The head portion 19 of the threaded member 16 is retained in the recess 20 of the body 10 by means of grub screws 24 and 25 extending through threaded bores 26 and 27 formed in the cylindrical portion 12 of the body. These bores may extend perpendicularly to the inclined faces 22 and 23 if desired. These bores are so disposed axially that when the head portion 19 of the threaded member 16 is inserted fully into the recess 20, with its upper face engaging the inner end of the recess, the screws engage the inclined faces at a position, as shown, adjacent to the lower ends of such faces. The threaded member 16 is thus held against axial movement relative to the body 10. The tool 14 can then be screwed onto the threaded portion 18 to engage the locating face 15. In use, the tool becomes firmly tightened onto the threaded member 16 into firm frictional engagement with the locating face 15.

In order to remove the tool 14, it is merely necessary to slacken the two grub screws 24 and 25 to an extent sufficient to allow the threaded member 16 to move axially outwardly by a small distance thereby relieving the frictional contact at the locating face 15. It is important to note that the grub screws need not be slackened off to an extent sufficient to allow the head portion 19 of the threaded member 16 to be removed from the recess 20.

It will also be noted that the threaded member 16 can be so dimensioned that unless the head portion 19 thereof is fully inserted into the recess 20, the tool 14 will not engage the locating face 15 when it is screwed fully onto the threaded portion 18, thus providing a clear indication that the tool holder is not set up correctly.

We claim:

1. In a rotary tool holder of the kind comprising
a rotary body having a forward end which affords an axially extending recess and a radially extending locating face for engagement with a complementary face of a tool to be held, and
a screw threaded member which projects from said recess and is formed with screw thread means for engagement with said tool,
the improvement comprising
 a. head means on the screw threaded member, said head means being disposed within said recess for preventing relative rotational movement between the body and the screw thread member, said head means including a transversely extending head to provide a longer transverse head dimension in one direction within a plane than in any other direction within said plane, the head being slidably received within said recess which is correspondingly configurated to slidably receive the head and to coact with the head to prevent said relative rotational movement,
 b. on the head, at least one laterally presented face which is inclined outwardly in a direction away from the forward end of the body, and
 c. on the body, at least one locking screw movable in a direction towards said inclined face to a first position and away from said inclined face to a second position, said first position holds the screw threaded member in an axially retracted position by engagement of said locking screw with said inclined face at a position adjacent to the end thereof nearer the forward end of the body, said second position allows the screw threaded member to move axially outwardly relative to the body.

2. A rotary tool holder as claimed in claim 1 wherein the screw threaded member includes a shank portion on which is formed said screw thread means, and the head of the screw threaded member extends transversely relative to said shank portion.

3. A rotary tool holder as claimed in claim 2 wherein said transverse head is formed with two of said inclined faces, each being provided on respective opposed sides of the head.

4. A rotary tool holder as claimed in claim 3 wherein said two inclined faces are disposed in diametrically opposed relation relative to the axis of rotation of the body.

5. A rotary tool holder as claimed in claim 4 wherein said inclined faces are formed in opposed parallel sides of said transverse head, each being laterally offset relative to the other.

6. A rotary tool holder as claimed in claim 1 wherein, forwardly of said radially extending locating face, said body comprises a cylindrical spigot portion which affords a circumferential locating face adapted to centre said tool on the axis of rotation of the body.

7. A rotary tool holder as claimed in claim 2 wherein, forwardly of said radially extending locating face, said body comprises a cylindrical spigot portion which affords a circumferential locating face adapted to centre said tool on the axis of rotation of said body, and said spigot portion is bisected by a diametrally extending slot through which said transverse head of said screw threaded member can pass to enter said recess.

8. A rotary tool holder as claimed in claim 7 wherein said screw thread means of the screw threaded member is confined to that part of the shank portion thereof which, in use, projects beyond the spigot portion of the body.

* * * * *